(12) United States Patent
Lawer et al.

(10) Patent No.: US 6,644,914 B2
(45) Date of Patent: Nov. 11, 2003

(54) ABRADABLE SEALS

(75) Inventors: Steven D Lawer, Derby (GB); Mark A Halliwell, Derby (GB)

(73) Assignee: Rolls-Royce plc, London (GB)

( * ) Notice: Subject to any disclaimer, the term of this patent is extended or adjusted under 35 U.S.C. 154(b) by 268 days.

(21) Appl. No.: 09/815,041

(22) Filed: Mar. 23, 2001

(65) Prior Publication Data

US 2001/0031201 A1 Oct. 18, 2001

(30) Foreign Application Priority Data

Apr. 12, 2000 (GB) .............................................. 0008892

(51) Int. Cl.⁷ ................................................. F01D 11/12
(52) U.S. Cl. ................................ 415/173.4; 415/173.5; 29/888.3
(58) Field of Search ............................ 415/173.5, 173.4; 29/888.3

(56) References Cited

FOREIGN PATENT DOCUMENTS

| DE | 0 151 071 D E | 8/1985 |
|----|---------------|--------|
| EP | 0 292 250 A   | 11/1988 |
| GB | 0 851 323 SP  | 10/1960 |
| GB | 1 361 814 SP  | 7/1974 |
| GB | 2 017 228 A   | 10/1979 |
| GB | 2 146 707 A   | 4/1985 |

*Primary Examiner*—Edward K. Look
*Assistant Examiner*—Kimya N McCoy
(74) *Attorney, Agent, or Firm*—W. Warren Taltavull; Manelli, Denison & Selter PLLC

(57) ABSTRACT

A sealing element (30) for a turbine of a gas turbine engine includes a radially inner surface region provided with an integrally formed seal structure (38) comprising a plurality of radially inwardly projecting walls (40). The walls may be abradable and may define cells (44) for receiving an abradable sealing material.

21 Claims, 5 Drawing Sheets

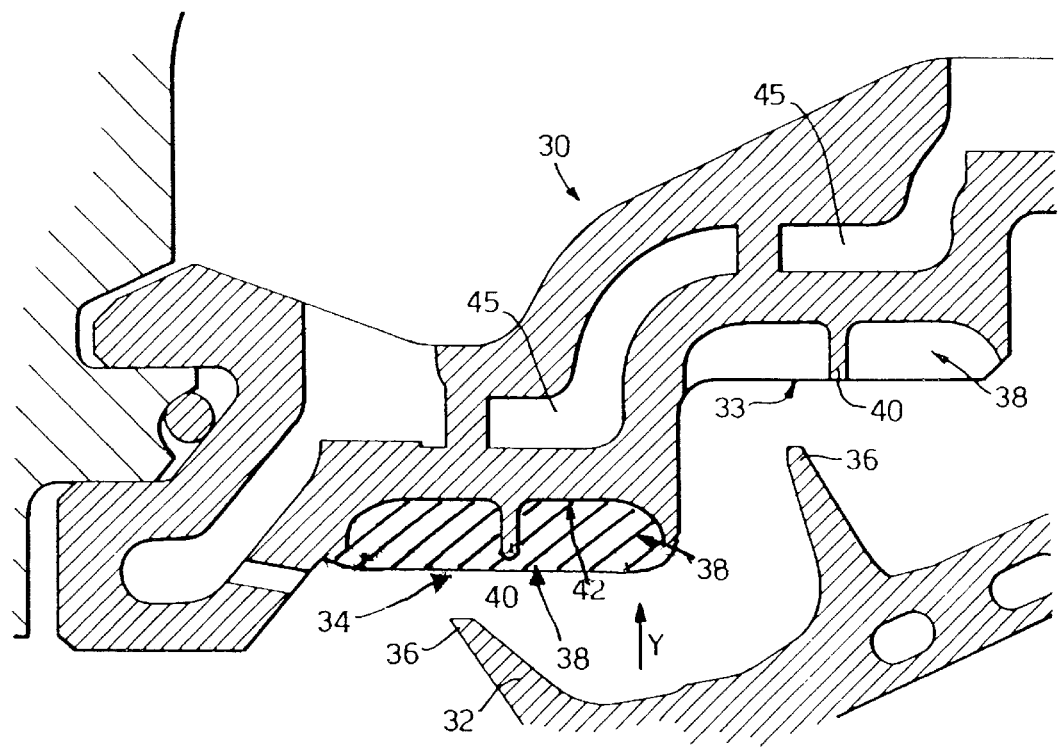

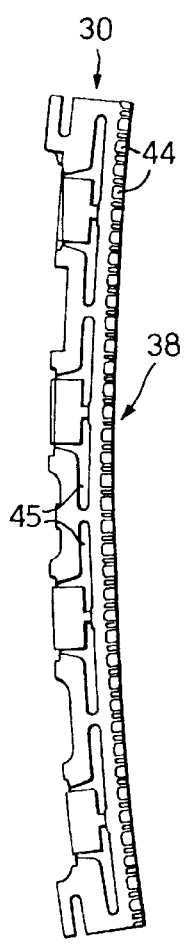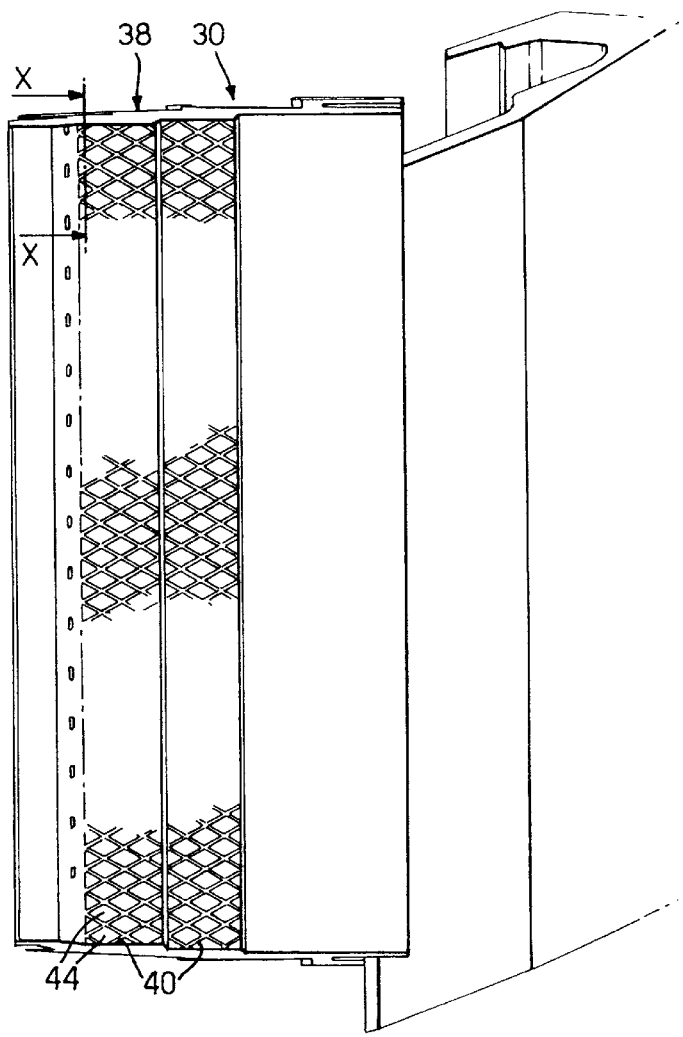

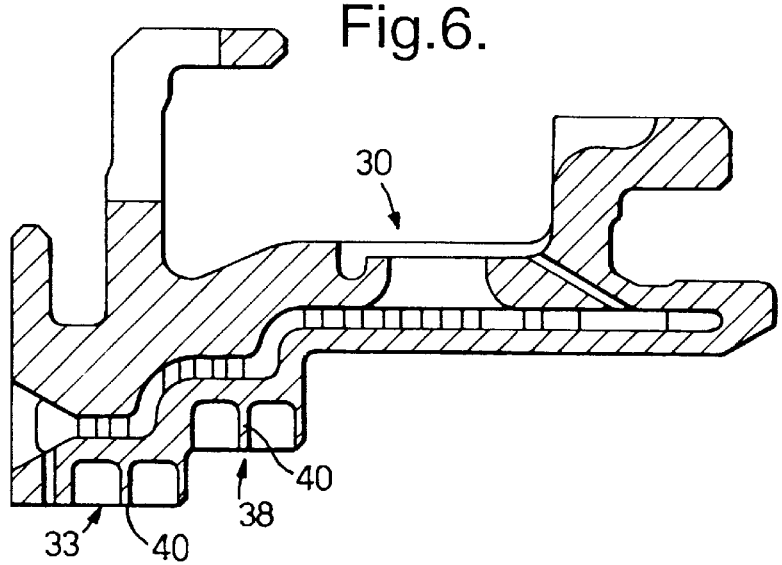
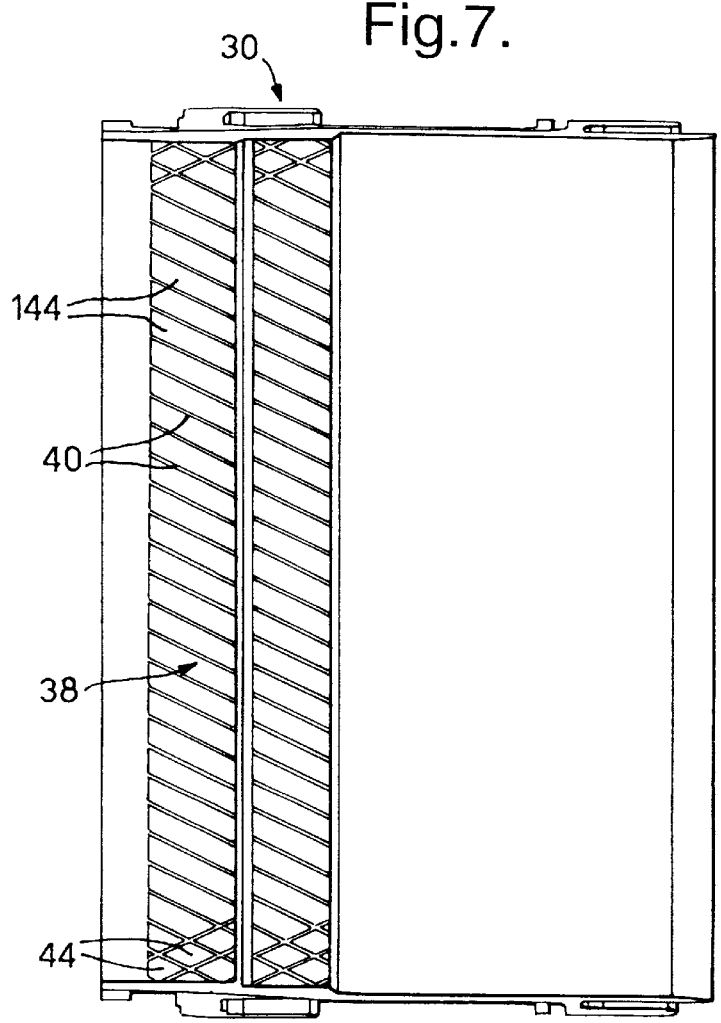

ABRADABLE SEALS

FIELD OF THE INVENTION

The invention relates to an abradable seal for a gas turbine engine.

BACKGROUND OF THE INVENTION

In gas turbine engines, some of the aerofoil blades and in particular the turbine blades are conventionally surrounded by a sealing structure, which may comprise an annular seal or a seal segment ring made up of a plurality of arc shaped seal segments. Because the turbine blades expand and contract as their temperatures vary in use and centrifugal loads are imposed upon them, it is normal to provide a small gap between the turbine blade tips and the seal, to allow for this fluctuation.

It is known to provide an abradable seal for sealing between the turbine blade tips and the sealing structure. This enables the tips of the turbine blades to wear away the seal to an optimum size and shape without causing damage to the turbine blade tips. Such abradable seals may consist of an open cell foil honeycomb which is brazed in place and subsequently filled with a suitable abradable material, such as a metallic powder. The foil honeycomb acts as a support for the abradable material and the abradable material and the supporting foil honeycomb is subsequently partially worn away by the rotating turbine blades, thus forming a seal.

Certain problems are associated with the above seals. The seals may suffer from progressive oxidation attack if the foil material has inadequate oxidation resistance. In addition, problems may be experienced with the brazed joints, and the seals may be difficult to cool.

SUMMARY OF THE INVENTION

According to the invention, there is provided a sealing element for positioning radially outwardly of at least some of the aerofoil blades of a gas turbine engine, a radially inner surface region of the sealing element including an integrally formed seal structure comprising a plurality of inwardly projecting walls.

The sealing element may comprise or form part of a generally annular housing for surrounding the tips of the blades of the turbine of said engine. The sealing element may comprise a seal segment.

Preferably the walls project substantially radially inwardly.

Preferably radially inner edges of the walls define a substantially arc shaped inner face of the sealing element.

Preferably the seal structure is provided over substantially the whole of a radially inner surface region of the sealing element.

The thickness of the walls may reduce generally towards their radially inner edges.

The walls may be shaped to form a plurality of radially open cells and each cell may be open only at a radially inner side. One or more of the cells may be substantially diamond shaped when viewed in the radial direction. The cells may be all substantially the same size or may be different sizes. The thickness of the walls may increase at their radially inner edges, such that the size of the cells reduces at their open radially inner sides.

According to the invention there is further provided a sealing element as defined in any of the preceding four paragraphs, wherein openings between the walls are at least partially filled with an abradable sealing material. The abradable sealing material may protrude radially inwardly beyond radially inner edges of the walls.

The walls may be abradable. By "abradable" it is meant that the material may be worn away by contact with the tips of rotating aerofoil blades, without causing significant damage to the blade tips.

According to the invention there is further provided a seal segment ring for a turbine of a gas turbine engine, the seal segment ring including a plurality of sealing elements as defined in any of the preceding nine paragraphs.

According to the invention there is further provided a gas turbine engine including a turbine comprising a seal segment ring as defined in the preceding paragraph. The turbine may be the high pressure turbine of the gas turbine engine.

According to the invention there is further provided a method of manufacturing a sealing element for positioning radially outwardly of at least some of the aerofoil blades of a gas turbine engine, the method including the step of integrally forming in a radially inner surface region of the seal segment a seal structure comprising a plurality of radially inwardly projecting walls.

The projecting walls may be formed by electro-discharge machining. The method may include the step of machining the walls using an electrode having a generally complementary shape to at least a part of the seal structure.

The method may include the step of manufacturing the electrode by machining the electrode to a generally desired radial profile and subsequently wire cutting grooves into the electrode, the grooves being for subsequently forming the walls of the seal structure.

As an alternative to electro-discharge machining, the method may include the step of integrally casting the walls into the sealing element. Preferably the method includes the further step of electro-chemically machining or etching the seal structure to reduce the thickness of the cast walls.

BRIEF DESCRIPTION OF THE DRAWINGS

An embodiment of the invention will be described for the purpose of illustration only, with reference to the accompanying drawings in which:

FIG. 2 is a diagrammatic section through a turbine seal segment according to the invention;

FIG. 3 is a diagrammatic view in the direction of the arrow Y in FIG. 2;

FIG. 4 is a diagrammatic section on the line X—X in FIG. 3;

FIG. 6 is a diagrammatic section through an alternative turbine seal segment according to the invention; and FIG. 7 is a diagrammatic view in the direction of the arrow x in FIG. 6.

DETAILED DESCRIPTION OF THE INVENTION

Figure 1:
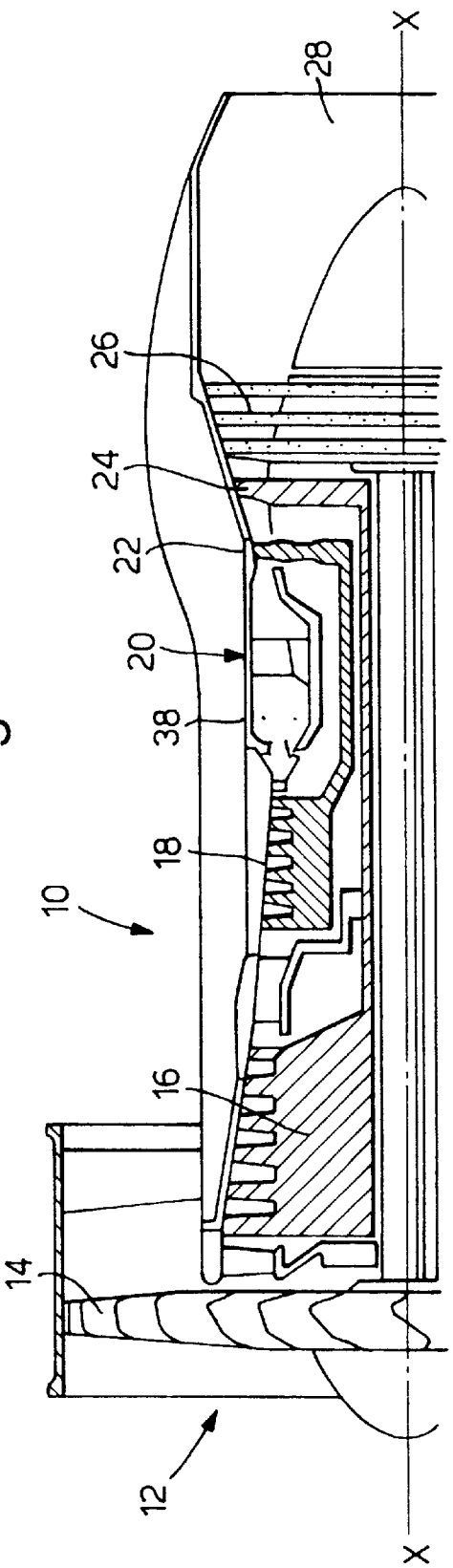
FIG. 1 is a schematic diagram of a ducted fan gas turbine engine.
Figure 5:
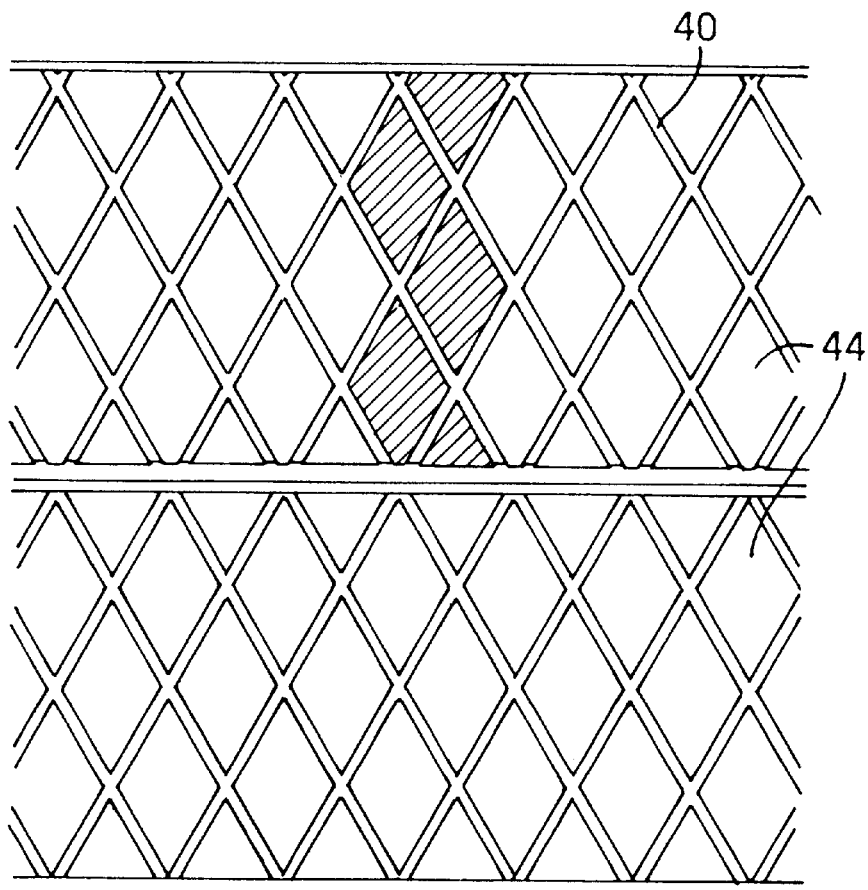
FIG. 5 is a diagrammatic partial detail of a cell structure of a turbine seal segment according to the invention.

With reference to FIG. 1 a ducted fan gas turbine engine generally indicated at 10 comprises, in axial flow series, an air intake 12, a propulsive fan 14, an intermediate pressure compressor 16, a high pressure compressor 18, combustion equipment 20, a high pressure turbine 22, an intermediate pressure turbine 24, a low pressure turbine 26 and an exhaust nozzle 28.

The gas turbine engine 10 works in the conventional manner so that air entering the intake 12 is accelerated by the fan 14 to produce two air flows, a first air flow into the intermediate pressure compressor 16 and a second airflow which provides propulsive thrust. The intermediate pressure compressor 16 compresses the air flow directed into it before delivering the air to the high pressure compressor 18 where further compression takes place.

The compressed air exhausted from the high pressure compressor 18 is directed into the combustion equipment 20 where it is mixed with fuel and the mixture combusted. The resultant hot combustion products then expand through and thereby drive the high, intermediate and low pressure turbines 22, 24 and 26 before being exhausted through the nozzle 28 to provide additional propulsive thrust. The high, intermediate and low pressure turbines 22, 24 and 26 respectively drive the high and intermediate pressure compressors 16 and 18 and the fan 14 by suitable interconnecting shafts.

FIGS. 2 to 4 illustrates a turbine seal segment 30 for the high pressure turbine 22. A plurality of arc shaped sealing elements in the form of a turbine seal segment together form a substantially cylindrical seal segment ring which encases the rotating high pressure turbine blades 32 (see FIG. 2). A small gap 34 is provided between the tips 36 of the turbine blades 32 and a radially inner surface 33 of the seal segment 30. The size of the gap 34 varies with time for various reasons, including variations in the temperatures of the turbine blades 32 and other components.

It is known to provide a coating of an abradable material on an inner surface of the casing, the abradable material being partially worn away by the tips 36 of the turbine blades 32. Conventionally, a foil open cell honeycomb is brazed onto the inner surface of the seal segment and filled with an abradable material such as a metallic powder.

Referring to the figures, according to an embodiment of the invention, an open cell structure 38 is formed integrally with the turbine seal segment 30 in the region of its radially inner surface 33. The open cell structure 38 includes upstanding walls 40 which project radially inwardly. The walls 40 define therebetween a plurality of open cells 44, the cells 44 having generally circumferential bases 42. The cells 44 are able to receive and support an abradable material such as a metallic powder.

In the illustrated example, the cells 44 are generally diamond shaped when viewed in the radial direction of the turbine and the walls are oriented at about 30° to the axial direction of the turbine, in use. A first set of generally parallel walls crosses over and intersects a second set of generally parallel walls to form the diamond shaped cells 44.

The walls 40 may project about 1 mm to 3 mm radially inwardly of the surface 42. The width of the walls 40 is about 0.2 mm to 0.3 mm and the generally parallel walls are located about 2 mm to 2.5 mm apart. In the example illustrated, the walls are generally rectangular in section.

Cooling channels 45 are provided within the seal segment 30, radially outwardly of the cell structure 38. Air flowing through the cooling channels helps to cool the cell structure 38 and any abradable material located therein.

The open cell structure 38 may be formed by electro-discharge machining, using an electrode having a generally complementary shape to the structure to be formed on the turbine seal segment. The electrode may be manufactured by machining to the required radial profile and subsequently wire cutting to produce a series of grooves in the pattern of the walls required in the open cell structure.

The electrode may then be used to machine the open cells 44 in the seal segment 30, the grooves formed by wire cutting the electrode producing the upstanding walls 40 of the open cell structure 38. Radially inner edges of the walls may subsequently be machined to a desired profile. The surfaces of the cells 44 may be nickel plated, and the cells may subsequently be filled with the abradable material. In use the blade tips of the high pressure turbine blades wear away the abradable material and the walls 40. Alternatively, the cells may be overfilled, such that the abradable material projects radially inwardly beyond the radially inner edges of the walls 40. In this case, the open cell structure 38 acts as a retention system for the abradable material, thus minimising damage to the walls 40 and facilitating repair of the structure.

The abradable material may include a metallic powder, which may be hardened and sintered. Alternatively materials such as ceramic powders might be used.

The above described embodiment thus provides a turbine seal segment which overcomes many of the problems associated with the prior art. There is no brazed joint between the open cell structure and the remainder of the seal segment and thus no possibility of the open cell structure becoming detached from the casing. In addition, the depth of the abradable material may be reduced since extra depth to accommodate wicked braze material is not required. The walls of the open cell structure have a relatively high oxidation resistance and are easily cooled because they are positioned near to the cooling channels 45.

FIGS. 6 and 7 illustrate an alternative embodiment of the invention, in which corresponding reference numerals are used for equivalent parts. In this embodiment the open cell structure 38 includes upstanding walls 40 which define therebetween a plurality of cells. In this embodiment a small number of generally diamond shaped cells 44 are located at the outer edges of the seal segment. However the majority of the cells 144 form elongate rhomboid shapes when viewed in the radial direction of the turbine.

Various modifications may be made to the above described embodiment without departing from the scope of the invention. The section of the walls illustrated is generally rectangular. However, an "Eiffel tower" section may be used, to improve cooling. In this embodiment, the width of the walls is increased towards their bases, thus providing improved transfer of heat to the cooling channels 45.

The width of the walls may however be somewhat increased at their radially inner edges, forming a reentrant shape, thus helping to prevent abradable material from becoming detached from the cell structure.

The open cells need not be diamond or rhomboid shaped, but for example be rectangular, triangular, etc. The cells may be discrete as illustrated, or may interconnect with one another.

A plurality of closely spaced walls or rails, which may be parallel, may form a seal structure.

The seal structure may act as a retention matrix for abradable material as described above, or may itself form the seal, with no additional sealing material being used.

The seal structure need not be formed by electro-discharge machining. Instead, for example, the structure may be cast integrally into the seal segment.

Subsequent to casting, electrochemical machining or etching may be used to reduce the thickness of the walls in the sealing structure.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A sealing element for positioning radially outwardly of the at least some of the aerofoil blades of a gas turbine engine, said sealing element defining a radially inner surface region which radially inner surface region includes an integrally formed seal structure comprising a plurality of inwardly projecting walls wherein the thickness of the walls reduces generally towards their radially inner edges.

2. A sealing element according to claim 1, wherein said sealing element comprises part of a generally annular housing for surrounding the tips of the blades of the turbine of said engine.

3. A sealing element according to claim 2, wherein said sealing element comprising a seal segment.

4. A sealing element according to claim 1, wherein said walls project substantially radially inwardly.

5. A sealing element according to claim 1, wherein radially inner edges of the walls define a substantially arc shaped inner face of the sealing element.

6. A sealing element according to claim 1, wherein said seal structure is provided over substantially the whole of a radially inner surface region of the sealing element.

7. A sealing element according to claim 1, wherein the walls are shaped to form a plurality of radially open cells.

8. A sealing element according to claim 7, wherein each cell is open only at a radially inner side.

9. A sealing element according to claim 7 wherein at least one of the cells is substantially diamond shaped when viewed in the radial direction.

10. A sealing element according to claim 1, wherein openings between the walls are at least partially filled with an abradable sealing material.

11. A sealing element according to any claim 1, wherein the walls are abradable.

12. A seal segment ring for a turbine of a gas turbine engine, the seal segment ring including a plurality of sealing elements according to claim 1.

13. A gas turbine engine including a turbine comprising a seal segment ring according to claim 12.

14. A gas turbine engine according to claim 13, wherein said turbine is the high pressure turbine of the gas turbine engine.

15. A sealing element for positioning radially outwardly of the at least some of the aerofoil blades of a gas turbine engine, said sealing element defining a radially inner surface region which radially inner surface region includes an integrally formed seal structure comprising a plurality of inwardly projecting walls wherein the thickness of the walls increases at their radially inner edges.

16. A method of manufacturing a sealing element for positioning radially outwardly of at least some of the aerofoil blades of a gas turbine engine, the method the including the step of integrally forming in a radially inner surface region of the sealing element a seal structure comprising a plurality of radially inwardly projecting walls, wherein said projecting walls are formed by electro-discharge machining.

17. A method according to claim 16, wherein the method includes the step of machining the walls using an electrode having a generally complementary shape to at least a part of the seal structure.

18. A method according to claim 17, wherein the method includes the step of manufacturing said electrode by machining said electrode to a generally desired radial profile and subsequently wire cutting grooves into said electrode, said grooves being for subsequently forming the walls of the seal structure.

19. A method according to claim 16, wherein the method includes the step of integrally casting said walls into the sealing element.

20. A method according to claim 19, further including the step of one of electro-chemically machining and etching said seal structure to reduce the thickness of the walls.

21. A sealing element for positioning radially outwardly of the at least some of the aerofoil blades of a gas turbine engine, said sealing element defining a radially inner surface region which radially inner surface region includes an integrally formed seal structure comprising a plurality of inwardly projecting walls, wherein openings between the walls are at least partially filled with an abradable sealing material and the abradable sealing material protrudes inwardly beyond radially inner edges of the walls.

* * * * *